United States Patent
Forrest

(10) Patent No.: US 8,290,436 B2
(45) Date of Patent: Oct. 16, 2012

(54) WIRELESS SELF-SERVICE TERMINAL AUDIO LEAD THROUGH

(75) Inventor: Simon J. Forrest, Dundee (GB)

(73) Assignee: NCR Corporation, Duluth, GA (US)

( * ) Notice: Subject to any disclaimer, the term of this patent is extended or adjusted under 35 U.S.C. 154(b) by 755 days.

(21) Appl. No.: 12/288,693

(22) Filed: Oct. 22, 2008

(65) Prior Publication Data

US 2010/0099356 A1 Apr. 22, 2010

(51) Int. Cl.
*H04B 7/00* (2006.01)

(52) U.S. Cl. ............... 455/41.2; 455/41.1; 455/41.3; 340/12.5; 340/12.51; 340/12.25; 340/12.26

(58) Field of Classification Search ............... 455/41.1, 455/41.2, 41.3; 340/12.5, 12.51, 12.25, 12.26
See application file for complete search history.

(56) References Cited

U.S. PATENT DOCUMENTS

| | | | |
|---|---|---|---|
| 2002/0174364 A1* | 11/2002 | Nordman et al. | 713/201 |
| 2004/0083212 A1* | 4/2004 | Palmquist | 707/4 |
| 2007/0001853 A1* | 1/2007 | Otranen | 340/572.1 |
| 2007/0181675 A1* | 8/2007 | Drummond et al. | 235/381 |
| 2009/0318082 A1* | 12/2009 | Sinton et al. | 455/41.2 |

* cited by examiner

*Primary Examiner* — Fayyaz Alam
(74) *Attorney, Agent, or Firm* — Dana T. Hustins

(57) ABSTRACT

A system for the audio lead through of a visually impaired user of a self-service terminal employs near field communication techniques to transfer connection data required for the establishment of a Bluetooth connection between the self-service terminal and a remote audio output device. Once a Bluetooth connection is established audio files containing instructions on how to execute a transaction on the self-service terminal are transferred from the self-service terminal to the audio output device such that the user can hear audio files when played.

16 Claims, 2 Drawing Sheets

FIG. 3
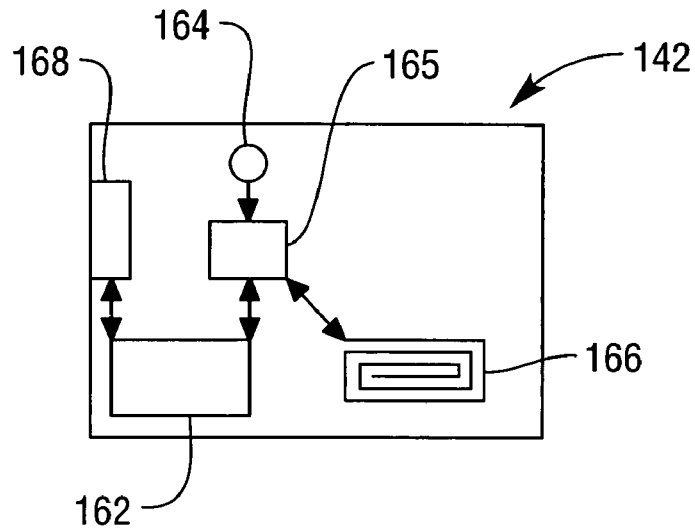
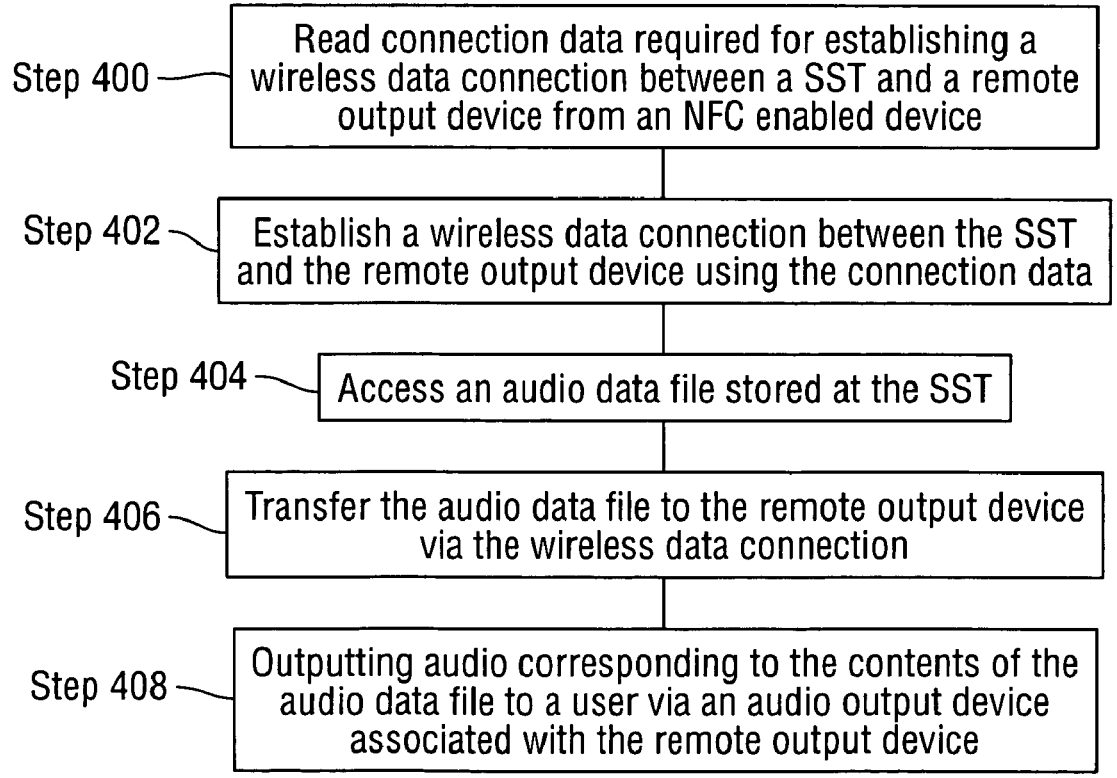
FIG. 4

WIRELESS SELF-SERVICE TERMINAL AUDIO LEAD THROUGH

FIELD OF THE INVENTION

This invention relates to wireless self-service terminal audio lead through. More particularly, but not exclusively, it relates to wireless self-service terminal audio lead through wherein connection data required to establish a secure wireless data connection is exchanged via a near field communications (NFC) link.

BACKGROUND OF THE INVENTION

A self-service terminal (SST) is generally defined as a machine that is suitable for allowing a user to conduct a transaction or to access information in an unassisted manner and/or in an unattended environment. An organization that deploys a SST may provide human assistance and/or supervision for users of the SST. However, SSTs are typically designed so that assistance and/or supervision is not required.

Access to self-service terminals for visually impaired users often requires an audio lead through to guide a user through their transaction at the terminal.

Typically, jack plug sockets have been provided into which a user can plug an audio output device, such as a set of headphones or a mobile telephone, to allow the output of the audio lead through. This arrangement has the inherent problem that the visually impaired user must find small the jack plug socket on the fascia of the SST. Also, the wire for connecting the headphones to the jack plug socked can become tangled and must be untangled prior to connecting the headphones to the SST. Clearly, untangling a wire can be problematic for a visually impaired user.

Additionally, there are issues regarding the rights of the visually impaired user not to be distinguished from other users, particularly as criminals may consider a visually impaired user to be more vulnerable than other users. The use of special equipment, such as a headset with a wired connection to an SST, identifies the user as visually impaired.

Wireless connection of audio output devices to SSTs has been proposed, for example via Bluetooth. However, the proposed connection schemes have problems associated with them.

In one proposed scheme, each SST stores a register of the addresses of all possible devices that may connect to it in order to allow it to poll for devices in its vicinity and, if a device is found, verifies that the device has permission to connect to the SST. This would require the dynamic updating of the register at each SST via network infrastructure. Dynamic updating of the SST registers involves the frequent transfer of a large amount of data over the network infrastructure which affects network efficiency for transaction verification.

An additional difficulty is that identification (ID) number used in Bluetooth to verify a connection between the SST and the audio output device has to be the same for all SSTs. Clearly, having the same ID number for every SST in a network compromises the security of the SST network.

Alternatively, a specific ID number could be defined for each user and appended to the register entry for each audio output device. This results in an increase in the volume of data that must be transferred across the SST network, further exacerbating the problem identified in relation to the register based solution hereinbefore.

SUMMARY OF THE INVENTION

According to a first aspect of the present invention there is provided a self-service terminal comprising:

a control module;
and a wireless communication module;
the NFC communication module being arranged to emit an interrogation signal and to receive connection data from an NFC enabled device, the connection data being required for establishing a wireless data connection between the wireless communication module and a remote output device;
the control module being arranged to receive the connection data and to instruct the wireless communication module to establish a wireless data connection with the remote output device using the connection data;
the wireless communication module being arranged to establish a wireless data connection between the SST and the remote output device and to transfer an audio data file from the SST to the remote output device via the wireless data connection.

It will be appreciated that the term NFC as used herein refers to short range, typically less than 20 cm, radio frequency identification (RFID) type technologies.

The use of NFC to transmit data required for the establishment of a connection between the wireless communication of the module and the remote output device means that a visually impaired user does not have to find a small jack plug socket on the fascia of the SST. Also, the use of NFC represents an improvement over the previous attempts to establish wireless connections between the SST and remote output device as there is no requirement-to-maintain and update a registry of devices authorized to connect to the SST.

The data connection may comprise a Bluetooth data connection.

The audio data file may be stored at the SST as a digital file, such as a .WAV file, an MP3 file, a .WMA file, an AVI file, or the like. The audio data file may comprise an audio sequence instructing a user in at least one operation of the SST. The SST may comprise a plurality of audio data files each detailing the execution of a function of the SST. The control module may be arranged to selectively output at least one of the plurality of audio data files in response to a user input at the SST. The remote device may be arranged to output the audio sequence to the user. The remote device may be arranged to stream the audio sequence. Alternatively, the remote device may be arranged to receive the complete audio data file prior to outputting the audio sequence.

The connection data may comprise at least one of the following: device address, passkey, the device class, a list of services provided by the device, technical information associated with the device, Bluetooth specification used, clock offset.

The NFC enabled device may comprise an NFC tag. Alternatively, the NFC enabled device may comprise a module of the remote output device.

The self-service terminal may comprise an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

The remote output device may comprise an earpiece, a headset, a mobile telephone, a personal digital assistant (PDA), a hearing aid.

According to a second aspect of the present invention there is provided an NFC enabled device comprising:
an aerial;
a processor;
the aerial being arranged to receive the interrogation signal and to pass the interrogation signal to the processor;

the processor storing connection data required to establish a wireless connection between a SST and a remote output device, and being arranged to pass the connection data to the aerial in response to receiving the interrogation signal;
the aerial being further arranged to transmit the connection data such that a data connection is established between the SST and the remote output device over which an audio data file is transmitted.

The NFC enabled device may form part of the remote output device. A processor of the remote output device may be arranged to decode the audio data file and to output it to a user via an audio output device of the remote output device.

The audio data file may contain audio instructions for the execution of at least one function of the SST. The audio data file may comprise any one of the following: a .WAV file, an MP3 file, a .WMA file, an AVI file, or the like. The device may comprise at least one of the following: an earpiece, a headset, a mobile telephone, a personal digital assistant (PDA), a hearing aid.

According to a third aspect of the present invention there is provided an audio lead through system comprising the SST of the first aspect of the present invention and the RFID enabled device of the second aspect of the present invention.

According to fourth aspect of the present invention there is provided a method of providing audio lead through for a user of a SST comprising the steps of:
i) reading connection data required for establishing a wireless data connection between a SST and a remote output device from an NFC enabled device;
ii) establishing a wireless data connection between the SST and the remote output device using the connection data;
iii) accessing an audio data file stored at the SST;
iv) transferring the audio data file to the remote output device via the wireless data connection; and
vi) outputting audio corresponding to the contents of the audio data file to a user via an audio output device associated with the remote output device.

The method may comprise accessing an audio data file at the SST in response to a user input at the SST. The method may comprise streaming the audio data file. The method may comprise discovering the SST and the remote output device using an NFC channel. The method may comprise exchanging cryptographic keys using an NFC channel.

BRIEF DESCRIPTION OF THE DRAWINGS

At least one preferred embodiment of the present invention will now be described, by way of example only, with reference to the accompanying drawings, in which:

FIG. 3 is a schematic representation of the NFC reader module of the self-service terminal shown in FIG. 1; and FIG. 4 is flow chart detailing the steps of a method of providing audio lead through for a user of a SST according to an aspect of the present invention.

DETAILED DESCRIPTION OF PREFERRED EMBODIMENTS

Figure 1:
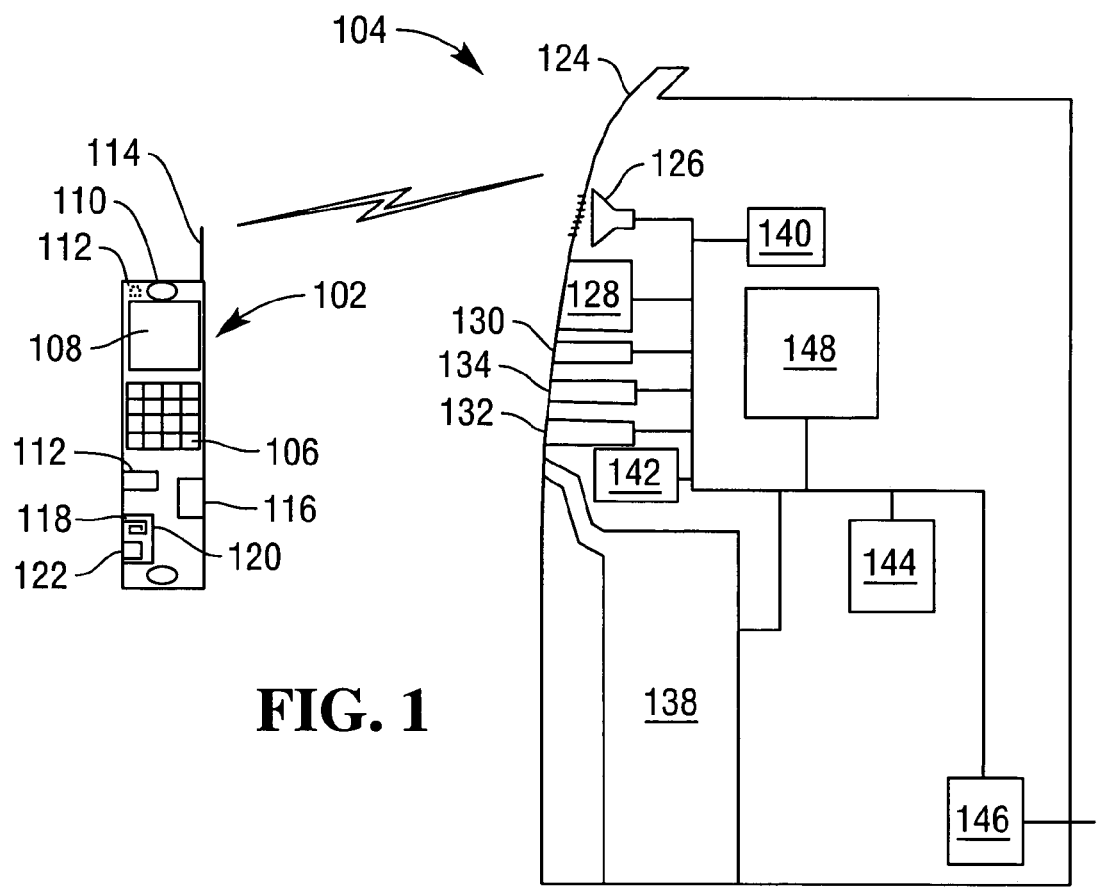
FIG. 1 is a schematic representation of an audio lead through arrangement according to an aspect of the present invention.
Figure 2:
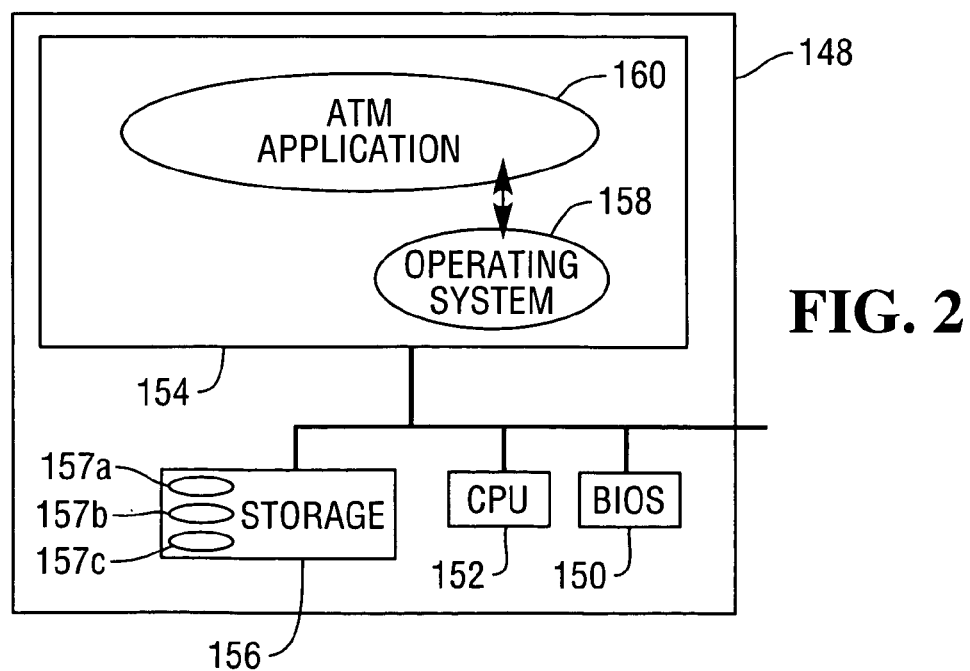
FIG. 2 is schematic representation of a controller of a self-service terminal shown in FIG. 1.

Referring now to FIGS. 1 to 3, an audio lead through arrangement 100 comprises a mobile telephone 102 and an ATM 104.

The mobile telephone 102 comprises a keypad 106, a screen 108, a speaker 110, a Bluetooth transceiver 112, a cellular transceiver 114, a processor 116 and an NFC module 118.

Usually, the Bluetooth transceiver 112 operates in the frequency band between 2.4-2.4835 GHz. Typically, the frequency band is divided into seventy nine 1 MHz wide sub-channels. Usually, the transceiver is arranged to hop between sub-channels up to one thousand six hundred times per second wherein the hopping sequence derives from the address and clock of one of two connected devices, known as the master device, and is pseudo-random.

The NFC module 118 comprises an aerial 120 and a processor 122. The processor 122 modulates and demodulates radio-frequency signals and generates an information signal.

Typically, for high frequency, 3-30 MHz applications the aerial 120 is a lithographically formed metal spiral. For ultra high frequency applications, 300 MHz-3 GHz, a bent or meandered dipole antenna aerial 120 with impedance matching to the processor 122 may be used.

In the present embodiment the NFC module 118 will be described with reference to a passive NFC module with no internal power source. However, it will be appreciated that the present invention is equally applicable to semi-passive and active NFC modules as it is to passive RFID tags. A semi-passive module incorporates a power source that powers the IC. An active module comprises a power source that powers the IC and provides power to the output of a broadcast signal in response to an interrogation signal.

The processor 122 stores the connection data required to establish a Bluetooth connection between the mobile telephone 102 and another device. Typically, the connection data includes, but is not limited to, the mobile telephones forty eight bit address, the passkey required to establish a trusted relationship, the device class, a list of services provided by the device, and technical information associated with the device, for example, device features, manufacturer, Bluetooth specification used, clock offset.

The ATM 104 comprises a molded fascia 124 in which slots allow access to functional modules located within the ATM 104. Non-limiting examples of modules found within the ATM include a loudspeaker 126, a display 128 having function defined keys (FDKs) 130 adjacent opposite vertical edges thereof, an encrypting keypad 132, a motorized card reader 134, a cash dispenser 138, a Bluetooth transceiver 140 and an NFC reader module 142.

The ATM 104 also includes an internal journal printer 144 for creating a record of all transactions executed by the ATM 104, a network connection 146 for communicating with a remote transaction host for authorizing transactions, and an ATM controller 148 that controls the operation of the modules within the ATM 104.

Referring now particularly to FIG. 2, the controller 148 is typically a PC core running the Microsoft® Windows XP® system. The controller 148 comprises a BIOS 150 stored in non-volatile memory, a microprocessor 152, associated main memory 154, and a data storage device 156, usually in the form of a disc drive. The data storage device 156 stores at least one audio data file 157a. The audio data file 157a comprises an audio sequence listing instructions for executing a function of the ATM 104. The audio data file 157a may list instructions for executing all functions of the ATM 104. Alternatively, the data storage device 156 may store a plurality of audio data files 157a-c, each relating to a specific function of the ATM 104. Typically, the audio data file comprises a .WAV file, an MP3 file, a .WMA file, an AVI file, or the like In use, the ATM 104 loads an operating system kernel 158 and an ATM application program 160 into the main memory 154. The ATM application program 160 includes conventional routines and objects for controlling the operation of the ATM 104, such as providing the sequence of screens used in each transaction and monitoring the condition of each module and/or device within the ATM 104, as is known to those of skill in the art.

Referring now to FIG. 3 in particular, the NFC reader module 142 comprises a processor 162, a radio-frequency source 164, a modulator/de-modulator unit 165, an aerial 166 and a communications port 168. The communications port 168 links to a communications bus (not shown) of the ATM 104.

Connection data associated with the ATM 104, such as the ATM's forty eight bit address, passkey etc., is stored at the controller 144.

In use, the radio-frequency source 164 generates a radio-frequency interrogation signal, typically, but not necessarily, a continuous wave (CW) signal. The interrogation signal is modulated onto a carrier wave at the modulation/de-modulation unit 165 and broadcast via the aerial 166. Any suitable modulation unit 165 known to a person skilled in the art can be employed.

The interrogation signal is received at the aerial 120 of the NFC module 118. The processor 122 of the NFC module demodulates the interrogation signal, for example in the case of a backscattering passive tag by means of a Schottky diode that is impedance matched to the aerial 120. Other suitable demodulators known to a person skilled in the art can be employed. The processor 122 then determines if the interrogation signal is valid, for example by checking for an embedded security code within the signal. If the interrogation signal is valid, the processor 122 passes a request for connection data to the processor 116 of the mobile telephone 102. In response to the request for connection data the processor 116 outputs an authorization screen to the mobile telephones display 108. The user then authorizes the connection or not, dependent upon their preference, using the keypad 106, a touchscreen contact area if a touch screen is provided, or via a voice command input to the mobile telephone's microphone. Alternatively, the mobile telephone 102 may output an audio signal to the user as this may prove easier for a visually impaired user to recognize than characters on the display 108.

Once authorized the Bluetooth device discovery phase is entered into via an NFC channel with discovery information being exchanged between the mobile telephone 102 and the ATM 104. Typical discovery information includes, but is not restricted to the Bluetooth device address of the mobile telephone 102 and the ATM 104, and the cryptographic information required to establish a secure data link. Either mobile telephone 102 or the ATM 104 establishes a Bluetooth connection with the other using the respective Bluetooth address exchanged during the device discovery phase. The other data exchanged during the device discovery phase is used in the authentication phase of pairing the Bluetooth devices. The pairing of the mobile telephone 102 and the ATM 104 may be implemented as either read only or read/write. If one side is read only, a one way authentication is performed. If both sides are read/write, a two-way authentication is performed. Thus, the NFC channel is used to both discover the devices as well as to exchange or transfer cryptographic numbers, or keys, required for the pairing process.

The respective Bluetooth transceivers of the mobile telephone 102 and the ATM 104 establish a Bluetooth connection data therebetween, typically using the Link Manager Protocol (LMP). Typically, the LMP manages the continuation of the data link including authentication between the handset and SST and, where appropriate encryption of data.

Upon establishment of the Bluetooth connection the control module accesses an initial audio data file 157a detailing the initial stage of user interaction with the ATM 104. The initial audio data file 157a is transferred from the ATM 104 to the mobile telephone 102 over the Bluetooth connection, via their respective Bluetooth transceivers 140,122. The initial audio data file 157a will contain instructions regarding the initial transaction phase, for example PIN entry.

Possible data transfer protocols include, but are not limited to, point-to point protocol (PPP), TCP/IP/UDP, Object Exchange Protocol (OBEX) or Wireless Application Environment/Wireless Application Protocol (WAE/WAP).

The initial audio data file 157a is decoded by the mobile telephone's processor 116 and is output via the speaker 110 of the mobile telephone 102. Alternatively, an ear piece can be connected to the mobile telephone 102 in order to give a private audio output capability, either via a wireless connection, such as a Bluetooth earpiece, or via a wired connection such as a jack plug inserted into a socket in the mobile telephone (not shown). The decoding of the audio data file may be done on the fly such that the audio data file is streamed. If streamed the audio data file can be transmitted to the mobile telephone 102 using the Advanced Audio Distribution Profile (A2DP), Hands-Free Profile (HFP) or another protocol or profile suitable for wirelessly streaming audio data between devices. Alternatively, the processor 116 may decode the whole audio data file once it is downloaded fully from the ATM 104.

As the user interacts with the ATM 104 different screens are called and displayed on the display 128. Each screen will have particular functionalities associated with it and the ATM's microprocessor 152 accesses respective audio data files 157b,c for each screen. These audio data files 157b,c are uploaded to and played on the mobile telephone 102 in the manner described hereinbefore in relation to the initial audio data file.

In an alternative embodiment, not shown, an NFC card that is separate from the mobile telephone has connection data associated with the mobile telephone 102 stored upon it. In this embodiment the user brings the NFC card into close proximity with the ATM 104 and the connection data is transferred to the ATM 104 which then uses the connection data to establish a Bluetooth connection with the mobile telephone substantially as described hereinbefore.

Referring now to FIG. 4, a method of providing audio lead through for a user of a SST comprises reading connection data required for establishing a wireless data connection between a SST and a remote output device from an NFC enabled device (Step 400). A wireless data connection is established between the SST and the remote output device using the connection data (Step 402). An audio data file stored at the SST is accessed (Step 404) and transferred to the remote output device via the wireless data connection (Step 406). Audio corresponding to the contents of the audio data file are output to a user via an audio output device associated with the remote output device (Step 408).

It will be appreciated that although described with reference to a mobile telephone the present invention is applicable to any remote output device, for example an earpiece, a headset, a personal digital assistant (PDA), or a hearing aid.

It will be further appreciated that although described with reference to an ATM the present invention is applicable to any suitable SST. Examples of suitable SSTs include, but are not limited to, an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

It will also be appreciated that the steps of the methods described herein may be carried out in any suitable order, or simultaneously where appropriate. The methods described herein may be performed by software in machine readable form on a tangible storage medium or as a propagating signal.

As described herein the SST comprises one or more modules each of which is operable to perform at least one specific function Typically, the module implements its function either in response to a customer action and/or a command received from a PC core (which is also a module) of the SST. Non-limiting examples of modules include: display, card reader, journal printer, rear operator panel, encrypting keypad, PC core, cash dispenser etc.

Typically, each module comprises a processor to enable the module to perform its function, and a communications facility to enable the module to communicate with the controller, but in some instances this may not be essential.

Each module comprises one or more devices that contributes to the execution of the module's respective function. Typically, each device comprises a replaceable part within the module. Non-limiting examples of devices include: for the display module, a display panel, a display panel housing, and the like; for a cash dispense module, a note thickness sensor, a pick unit, a presenter unit, and the like.

Each device comprises one or more components configured to enable the device to contribute to the execution of the module's function. Non-limiting examples of components include: for a motorized card reader module, a width switch, a shutter, a pre-read magnetic head, a magnetic stripe reading head, and the like.

Various modifications may be made to the above described embodiment without departing from the spirit and the scope of the invention.

The invention claimed is:

1. A self-service terminal (SST) comprising:
a control module;
a wireless communication module; and
an NFC communication module;
the NFC communication module being arranged to emit an interrogation signal to a mobile telephone, wherein the interrogation signal comprises a security code;
the mobile telephone being adapted to emit an audible signal to an earpiece of a user in response to receiving said interrogation signal;
the mobile telephone being adapted to receive a voice command via a microphone from said user authorizing a connection to said SST;
the mobile telephone being adapted to enter a Bluetooth discovery phase with said SST to establish a wireless data connection with said SST using connection data provided by said mobile telephone to said SST;
the wireless communication module being arranged to transfer an audio data file from the SST to the mobile telephone via the wireless data connection;
wherein the audio data file comprises instructions regarding at least one operation of the SST.

2. The SST of claim 1, wherein the data connection comprises a Bluetooth data connection.

3. The SST of claim 1, wherein the audio data file is stored at the SST as a digital file, such as a .WAV file, an MP3 file, a .WMA file, an AVI file, or the like.

4. The SST of claim 1 wherein the SST comprises a plurality of audio data files each detailing the execution of a function of the SST.

5. The SST of claim 4, wherein the control module is arranged to selectively output at least one of the plurality of audio data files in response to a user input at the SST.

6. The SST of claim 1, wherein the connection data comprises at least one of the following: device address, passkey the device class, a list of services provided by the device, technical information associated with the device, Bluetooth specification used, clock offset.

7. The SST of claim 1, wherein the self-service terminal comprises an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

8. An NFC enabled device comprising:
an aerial;
a processor;
an earpiece; and
a microphone;
the aerial being arranged to receive an interrogation signal from an NFC-enabled self-service terminal (SST) and to pass the interrogation signal to the processor, wherein said interrogation signal comprises a security code;
the processor being adapted to emit an audible signal via said earpiece to a user in response to receiving said interrogation signal;
the microphone being adapted to receive a voice command from a user authorizing a wireless connection to said SST;
the microphone being adapted to transmit a signal to said processor authorizing said wireless connection;
the processor storing connection data required to establish said wireless connection between the SST and the NFC enabled device, and being arranged to pass the connection data to the aerial in response to receiving said signal from the microphone;
the aerial being further arranged to transmit the connection data such that a data connection is established between the SST and the NFC enabled device;
the aerial being further arranged to receive an audio data file from the SST via the data connection;
wherein the audio data file comprises instructions regarding at least one operation of the SST.

9. The device of claim 8, wherein the processor of the NFC enabled device is arranged to decode the audio data file and to output it to a user via the earpiece of the NFC enabled device.

10. The device of claim 8, wherein the audio data file is any one of the following: a .WAV file, an MP3 file, a .WMA file, an AVI file, or the like.

11. An audio lead through system comprising a self-service terminal (SST) comprising:
a control module;
a wireless communication module; and
an NFC communication module;
the NFC communication module being arranged to emit an interrogation signal to an NFC enabled device, wherein the interrogation signal comprises a security code;
the NFC enabled device being adapted to emit an audible signal to an earpiece of a user in response to receiving said interrogation signal;
the NFC enabled device being adapted to receive a voice command via a microphone from said user authorizing a connection to said SST;
the NFC enabled device being adapted to enter a Bluetooth discovery phase with said SST to establish a wireless data connection with said SST using connection data provided by said NFC enabled device to said SST;

the wireless communication module being arranged to transfer an audio data file from the SST to the NFC enabled device via the wireless data connection; and wherein the NFC enabled device comprises the device of claim 8.

12. A method of providing audio lead through for a user of a self-service terminal (SST) comprising the steps of:
i) emitting an interrogation signal at the SST, the interrogation signal comprising a security code;
ii) receiving said interrogation signal at an NFC enabled device;
iii) determining at said NFC enabled device whether said security code is valid;
iv) emitting, by said NFC enabled device, an audible signal to an earpiece of a user;
v) receiving, via a microphone of said NFC enabled device, a voice command from said user;
vi) entering, by said NFC enabled device, a Bluetooth discovery phase with said SST to establish a wireless data connection with said SST using connection data provided by said NFC enabled device to said SST;
vii) accessing an audio data file stored at the SST, the audio data file comprising instructions regarding at least one operation of the SST;
viii) transferring the audio data file to the NFC enabled device via the wireless data connection; and
ix) outputting audio corresponding to the contents of the audio data file to the user via the earpiece associated with the NFC enabled device.

13. The method of claim 12 further comprising selectively accessing an audio data file at the SST in response to a user input at the SST.

14. The method of claim 12 further comprising streaming the audio data file.

15. The method of claim 12 comprising discovering the SST and the NFC enabled device using an NFC channel.

16. The method of claim 12 comprising exchanging cryptographic keys using an NFC channel.

* * * * *